US010191183B2

(12) United States Patent
Prikryl et al.

(10) Patent No.: US 10,191,183 B2
(45) Date of Patent: Jan. 29, 2019

(54) METHOD OF CONSTRUCTING DIGITAL TERRAIN MODEL (71) Applicant: R.O.G. s.r.o., Prague (CZ)

(72) Inventors: Marek Prikryl, Prague-Velka Chuchle (CZ); Lukas Kutil, Caslav (CZ); Vitezslav Obr, Trebic (CZ)

(73) Assignee: R.O.G. s.r.o., Prague (CZ)

(*) Notice: Subject to any disclaimer, the term of this patent is extended or adjusted under 35 U.S.C. 154(b) by 0 days.

(21) Appl. No.: 15/324,581

(22) PCT Filed: Jul. 8, 2015

(86) PCT No.: PCT/CZ2015/000072
§ 371 (c)(1),
(2) Date: Jan. 6, 2017

(87) PCT Pub. No.: WO2016/008459
PCT Pub. Date: Jan. 21, 2016

(65) Prior Publication Data
US 2017/0205534 A1   Jul. 20, 2017

(30) Foreign Application Priority Data
Jul. 15, 2014   (CZ) .................................. PV2014-489

(51) Int. Cl.
G01V 99/00   (2009.01)
G01C 5/00   (2006.01)
(Continued)

(52) U.S. Cl.
CPC .......... *G01V 99/005* (2013.01); *E01C 19/006* (2013.01); *E01C 23/01* (2013.01);
(Continued)

(58) Field of Classification Search
USPC ............................................................. 702/5
See application file for complete search history.

(56) References Cited

U.S. PATENT DOCUMENTS

| 2010/0034426 A1* | 2/2010 | Takiguchi | G01C 21/3602 |
| | | | 382/106 |
| 2014/0009604 A1* | 1/2014 | Hinderling | G01C 15/002 |
| | | | 348/142 |
| 2014/0063232 A1* | 3/2014 | Fairfield | G06K 9/78 |
| | | | 348/118 |

FOREIGN PATENT DOCUMENTS

| GB | 2434269 A | 7/2007 |
| IT | M02011A000313 | 6/2013 |

OTHER PUBLICATIONS

Vestol, Olav et al., "Reports in Geodesy and Geographical Information Systems Review of current and near-future levelling technology—a study project within the NKG working group of Geoid and Height Systems", May 28, 2014 (62 pages).

(Continued)

*Primary Examiner* — Paul D Lee
(74) *Attorney, Agent, or Firm* — Hovey Williams LLP (57) ABSTRACT PROBLEM: Efficiently generating digital terrain model (DTM) having high elevation surface accuracy and high point density, and suitable for controlling pavement milling machines during road repairs. SOLUTION: Combination of motorized levelling and Stop-Go mobile laser scanning system, including train of three vehicles, which are at standstill during measurements, and which move in unison in between measurements. Middle vehicle carries laser scanner, elevation sight, and GNSS receiver. Front and rear vehicle each carry levelling rod; front vehicle also carries GNSS receiver. During measurement cycle, laser scanner generates point cloud, while GNSS positions of middle and front vehicles and elevations at the resp. positions of front and rear vehicles are determined. After measurement cycle, vehicle train moves until rear vehicle halts at previous GNSS position of front vehicle, etc. When all measurement (Continued)

cycles are completed, collected data is integrated and transformed into a DTM.

14 Claims, 6 Drawing Sheets

(51) Int. Cl.
    *E01C 23/01*     (2006.01)
    *E01C 19/00*     (2006.01)
    *G01S 19/24*     (2010.01)
    *G05D 1/02*     (2006.01)

(52) U.S. Cl.
    CPC ............... *G01C 5/00* (2013.01); *G01S 19/24* (2013.01); *G05D 1/0278* (2013.01); *G05D 1/0287* (2013.01); *E01C 19/004* (2013.01)

(56) References Cited

OTHER PUBLICATIONS

Saaranen, Veikko, "On the Automatization of the Motorized Levelling", Mar. 14, 2013, Finish Geodetic Institute, NKG Scientific Week, Reykavik, Iceland (14 pages).
Heikkila, Rauno et al, Stop & Go Scanning for Highways—3D Calibration Method for a Mobile Laser Scanning System, 27th International Symposium on Automation and Robotics in Construction, Jun. 27, 2010, Bratislava, Slovakia (9 pages).
International Search Report in Corresponding PCT/CZ2015/000072 dated Nov. 5, 2015 (5 pages).
Written Opinion of the International Searching Authority in Corresponding PCT/CZ2015/000072 dated Nov. 5, 2015 (13 pages).
International Preliminary Report on Patentability in Corresponding PCT/CZ2015/000072 dated Nov. 7, 2016 (22 pages).

\* cited by examiner

METHOD OF CONSTRUCTING DIGITAL TERRAIN MODEL

CROSS-REFERENCE TO RELATED APPLICATIONS

This non-provisional patent application is the U.S. National Stage of International Patent Application No. PCT/CZ2015/000072, filed Jul. 8, 2015, which is herein incorporated by reference in its entirety, and which claims priority to Czech Application No. PV2014-489, filed Jul. 15, 2014, which is also herein incorporated by reference in its entirety.

TECHNICAL FIELD

The invention relates to a method of measuring, processing and use of digital terrain model data for objective evaluation of geometric parameters of measured objects, the method of processing the measured data and the use of the outputs for evaluation and comparison of the measured objects, e.g. road surfaces, runways, hall floors and other paved surfaces, or a possibility of the use as navigation for a milling machine during repairs of these surfaces, as navigation for inspecting the geometric parameters, as a tool for objective determination of the material volume, e.g. for a bill of quantities and for the evaluation system of constructions and their contractors. Furthermore, the subject-matter of the invention is a measuring device especially for the given method performance. The invention can be used in the phase of planning, implementation and inspection of construction and surface repairs.

DESCRIPTION OF RELATED ART

It is not known to the originators that obtaining a digital terrain model (hereafter referred to as "DTM") according to the invention for building structures and the reconstruction of roads, runways, hall floors and other paved surfaces with the guaranteed identical elevation surface accuracy characterised by the elevation standard deviation from 2 mm to 5 mm in relation to the vertical coordinate system and with the point density from 25 points/m$^2$ to 2000 points/m$^2$ or higher at any place of the measured structure for objective determination of geometric parameters with a possibility of their application as a qualitative indicator for the evaluation system, construction comparison and the quality scale of contractors' work and/or the navigation for repairs, or the navigation for quality inspection is performed.

Generally, contact measuring instruments are used for the determination of geometric parameters most frequently, when the measurement operator ensures a direct contact of the measuring instrument with the measured object. Most often, it is the tachymetric measurement with total stations or it is the measurement with the Global Navigation Satellite System (hereafter referred to as "GNSS"). When surveying the terrain with these devices, a point raster is selected, e.g. every 20 m to 30 m or points in the cross-section every 5 m to 10 m, and it does not reach the density of the digital terrain model—25 points/m$^2$ to 2000 points/m$^2$ or higher. These are selective methods which subjectively depend on the measurement operator, they do not have a sufficient density of measured points for a detailed capturing of the measured object and the measurement accuracy of an unpaved terrain can be affected by sticking of the ranging rod tip (the lower end of the ranging rod) into the surface of the measured object. The measurement cannot be verified considering the selective point selection after covering the construction layer. These methods do not eliminate the effect of measurement operator's error, and thus they are subjective.

The elevations can also be determined in combination with the above stated contact measuring devices by the method of accurate or very accurate levelling while using accurate levelling instruments. These methods show a high accuracy of the elevation determination (10 mm resp. 1 mm). The use of the accurate and very accurate levelling method in combination with the measurement using the total stations or the GNSS receivers is time consuming, requires the stabilisation of measuring detailed points which are measured in two stages (once position, next elevation). They can only be used at the paved terrain when disruptive effects are limited (e.g. the provision of traffic limitation when there is traffic on the road).

Nowadays, these contact methods are being replaced by contactless methods consisting in indirect contact of the measuring instrument with the measured object. The laser scanning technology belongs to this group most often. The laser scanner is an active sensor which emits laser beams. During the measurement, the scanner is in one place at standstill, or it is in motion during measurement. These methods are contactless, they have a high density of measured points and these are non-selective measurement methods (the detailed measured points are not selected by the measurement operator).

During measurement in motion, the measured data relate to the position of the measurement trajectory and to the inclinations of the measuring system. The position of the measurement trajectory is determined by the GNSS receiver and it is made more accurate by an inertial unit. The inertial unit with odometer also records inclination and turning of the measuring system. The method is quick, but it does not achieve the elevation standard deviation from 2 mm to 5 mm in relation to the vertical coordinate system at any place of the measured object. The measurement does not have the same output accuracy in every place of the measured object. Thus, we do not achieve the same result when the measurement is repeated.

During the measurement at standstill, the data are collected from the so-called scan-position, i.e. the measured data relate to the position, orientation and inclination of the scanner. The position, orientation and inclination of the scanner (generally, scan-position registration) are determined either by a direct method, or by one of three indirect methods: registration by means of identical points, registration by means of cloud correlation, registration by means of similarity of the geometric shapes.

Both the methods of the scan-position registration require a direct or indirect combination with other geodetic methods such as GNSS measurement, tachymetric measurement using a total station, levelling measurement, laser scanning, measurement with a compass, clinometer etc. The process is time consuming and it is necessary to use the right combinations of the methods to guarantee the same output accuracy with regard to the vertical coordinate system in every place of the measured object. However, the method combination is time consuming and they run at different times with regard to different speeds of measurement methods and thus often in different atmospheric conditions. The measurement operator must be present on the road when making the measurement more accurate by means of the contact method. Therefore, the traffic limitation is necessary as a safety precaution during measurement on the road with traffic. It is also very organizationally demanding and time consuming. It is not known to the authors that the method of the static laser scanning was used for the DTM creation according to the invention.

A laser measuring device for mapping is known from the GB 2 434 269 document. This measuring device is designed as a mobile device, comprising one or two laser scanners and a device for the determination of position and orientation of a vehicle during the ride. The position accuracy is given by the used methods of the position and orientation determination such as a differential GPS, inertial measuring unit, gyroscopes and accelerometers. When using these methods for position and orientation determination, it is possible to determine the measurement uncertainty below 1 meter to only 10 cm. It is not known that the described device would obtain absolute detailed digital models of structures and road reconstructions with the same guaranteed elevation accuracy of the surface characterized by elevation standard deviation from 2 mm to 5 mm with regard to the vertical coordinate system at any place of the measured object for objective determination of geometric parameters with a possibility to use it as a qualitative indicator for the evaluation system, the road construction comparison and the quality scale of contractors' work or as navigation of the milling machine for road repairs and with a possibility of navigation for the geometric parameter inspection (thus DTM according to the invention).

Nowadays, the system of the automatic control of elevation and crosswise inclination of the milling drum is used for milling during road repairs. The milling with the remote milling machine control system is highly accurate and it is controlled by means of a created digital model of the project, three-dimensional project documentation by the control computer of the milling drum control, when the computer continuously automatically navigates and keeps the milling drum in the required elevation and crosswise inclination by means of hydraulics. The control computer processes the measured data from the total station, which is placed in the coordinate system of the construction and it continuously follows the reflective prism, which is placed on the post over the milling drum. The control computer compares the measured values of the position of the milling drum with the saved designed values in the control computer. This method is accurate, fast with minimum faults caused by the human factor, but also demanding for the construction conditions and preparation. For this method it is necessary to create a setting-out network for construction and ensure direct visibility between the total station and the reflective prism in every place of milling. This condition is time consuming for preparation and it cannot be used in many situations (e.g. in case of blocking of the view or impaired direct view between the total station and the milling machine caused by trees, confined space in a urban area, dissected terrain or on high embankments, bridges, in case of danger caused by traffic in surroundings, etc.). The described equipment for automatic control of elevation and cross-wise inclination of the milling drum is very expensive and it is also difficult to install with regard to overall technical exigency. Moreover, this technology must be installed on construction machines all the time during is construction works.

SUMMARY OF THE INVENTION

The purpose of the presented invention is to overcome the above-stated deficiencies of the described methods and measuring instruments, their use and result creation by means of a fast, accurate, safe, more compact and better depicting measuring device, which can create DTM according to the invention. Furthermore, it purpose is to minimise the subjective effect of the measurer, temperature and pressure effects on the measured quantities, e.g. angles and lengths. The invention brings measurement in the same time period, i.e. measurement of one cycle immediately in a short time period when the same atmospheric conditions can be expected; hereinafter referred to as "in the same time period", and the data registration with emphasis on the elevation surface accuracy enabling to create a detailed DTM with the guaranteed elevation surface accuracy characterised by the elevation standard deviation from 2 mm to 5 mm in relation to the vertical coordinate system at any place of the measured object, and repeatedly. DTM according to the invention with a higher accuracy than 2 mm can even be obtained on condition of further development in accuracy of contactless measuring devices and further creation of higher quality modelling of physical atmospheric functions.

When using more accurate contactless measuring devices, e.g. some phase scanners or optical scanners using the trigonometric measurement principle or specialised instruments for surface topography measurement than other pulse laser scanners, and creating higher quality modelling of physical atmospheric functions, DTM according to the invention with a higher accuracy than 2 mm can even be obtained.

DTM according to the invention is a basic measurement output, which is consequently used for objective calculations, objective inspection of the measured object or navigation for road repairs, or for navigation of quality inspection. The presented invention will ensure completely new possibilities of the objective evaluation of quality of road construction works and their contractors, which have not been possible so far. The basis of the invention is ensuring the objective real information about geometric parameters of measured objects, and the unique usability of the invention result is based on it.

The first part of the presented invention concerns the method of measurement, processing and use of DTM data for objective evaluation of geometric parameters of the measured objects of construction part surfaces, e.g. roads and other surfaces, by which digital terrain models with the guaranteed identical elevation accuracy in relation to the vertical coordinate system at any place of the measured object. Its principle is that measurement is performed in n successive cycles by means of measuring device instruments which are at standstill during the measurement and which successively move as a whole between individual measurement cycles; where n cycles create one measurement stage and where n is a number of measurement stages. During each measurement cycle, the measurement of the GNSS receiver position is performed, by which the Laser scanner position is also determined. Furthermore, the position of at least one stabilised or non-stabilised identical point is surveyed by means of a GNSS device. Furthermore, during this cycle the elevations are surveyed by means of altimetric traverse target devices of at least these two stabilised and non-stabilised identical points by the instrument for elevation sight always at least as one backsight and one foresight. After the measurement is completed or during the measurement, the data about the GNSS receiver position, the data about the laser scanner position and the data about the position and elevation of the stabilised and non-stabilised identical points are saved. At the same time of each cycle the detailed surface measurement is performed with a laser scanner, by which so-called point cloud is obtained. At least one identical point relating to the given cycle is gradually surveyed by means of a vehicle for foresight. In the following cycle, the whole measuring device in a row is moved, the middle vehicle to a new place of collection of detailed points, the end vehicle to a new backsight to a stabilised identical point and the front vehicle to a new foresight when the stabilisation of the identical point is performed and consequently to other identical points. In each cycle the point clouds of the measured object surface are measured in the coordinate system of the laser scanner and such collected data are saved for further processing in the computer for the data collection. When one measurement stage (n measurement cycles) is completed, the evaluation of spatial coordinates of detailed points from the laser scanner follows using the spatial coordinates of the laser scanner position and identical point position, followed by transformation into the global coordinate system. In this way the final position and orientation and approximate elevation and inclination of the point clouds of the individual scan-position of the laser scanner are obtained and the data are made more accurate by means of the measured stabilised and non-stabilised identical points transformed using elevation and inclination for obtaining a higher elevation accuracy of the output data. The obtained and more accurate data are further processed into a digital model of the real topographic surface of the measured object based on the measured data, where the digital model represents points on the measured object surface with the guaranteed elevation accuracy of the surface in the given time of one stage measurement.

It is suitable when stabilised identical points are the points of the altimetric traverse and they are used for the elevation accuracy improvement of the detailed data from the laser scanning at the same time together with non-stabilised identical points.

In case of damage of any elevation points in time, stabilised and non-stabilised identical points are advantageously connected to a set of elevation geodetic points during the measurement of classic connecting altimetric traverse.

In advantageous performance, each measurement stage starts and ends with cycles of measurement on identical elevation geodetic points with known and stable elevations above sea level.

In each measurement cycle, before the foresight, the stabilisation of the identical point is performed on the surface of the measured object, to which the foresight is performed and in the following cycle the backsight is performed to the same identical point, where the stabilisation is performed for one identical point with gun nails or with other suitable stabilization for the given surface; the identical point is marked with a reflexive paint to be found during the next cycle with the backsight.

Before starting the measurement stage, the both levelling rods are advantageously aligned based on the values of lengths of the rod meters, by which a possible error from incorrect length of the rod meter is eliminated, which enables moving of the instruments of the measuring device in the successive changes as a whole.

In advantageous performance, measurement of the position and elevation of the laser scanner and position and elevation of the identical points is performed with GNNS receivers and levelling instrument or geodetic total station or levelling rotational laser as an equivalent of the altimetric traverse in the same time period of each cycle.

It is advantageous when individual measurement stages are repeated in the determined time intervals especially in individual layers of the measured object structure due to changes caused by the progress of the measured object construction, or repairs of the measured object and other surfaces or due to the vertical shift of the measured object, by which the exactly defined, objectively determined and mathematically reverse-verifiable data about the shape, inclination, volume, spatial change in the give time interval of one or two stages of the measured object or its part are obtained.

During evaluation of measurement data on spatial coordinates of detailed points from the laser scanner by means of spatial coordinates of the scanner position and identical point position, the accuracy improvement of data registration from the detailed point cloud measurement is performed in terms of elevation and position. The data are transformed by means of the measured stabilised and non-stabilised identical points in terms of elevation and inclination for a higher elevation accuracy of output data; geometric transformation is performed, during which the position of the scan-position of detailed points from the laser scanner is changed based on similarity of the inclination and position of triangles, where a triangular network representing the first transformation model is created from the measured point clouds. Further, regular hexagons are created from the measured identical points which represent the second transformation model, where all points of the hexagon have the same measured elevation; each scan-position is made more accurate based on at least 3, more advantageously 6-16 identical points according to the density of identical points on the measured object.

In special cases, geometric transformation is also used advantageously. It is based on other geometric shapes than triangles, e.g. squares, rectangles, polygons, spheres, blocks, cubes and other 2D and 3D shapes.

From each individual measurement stage, a digital terrain model is created representing the points on the measured subject surface with the guaranteed elevation accuracy of the surface characterised by the elevation standard deviation from 2 mm to 5 mm in relation to the vertical coordinate system at any place of the measured object. Digital terrain models from the individual measurement stages are used for comparison with digital models of the project or with digital terrain models from other measurement stages.

The differential model between DTM of the current surface of the measured object, e.g. roads, and the digital models of the project of individual structural parts is used for objective determination of the volume of the selected item material, e.g. bill of quantities.

In advantageous performance, calculations of geometric statistics of the section of measured structures is used for the inspection of compliance of real geometric parameters with the digital model of the project in tables or a graphic illustration and for the determination of volumes of actually performed work or difference to the designed volumes.

In another advantageous use, a differential model between DTM of the existing surface of the road and a digital model of the project is used for milling navigation during road repairs.

During the measured object repairs, e.g. road repairs, the information from the differential digital terrain model about the milling depth is transferred to the place of the project implementation by means of navigation in a phone or geodetic device, when the highly accurate information about the DTM elevation in a certain place of the measured object, e.g. roads or other structures, is obtained by assigning the highly accurate elevation from DTM and by position determination with a less accurate device, e.g. a GNSS receiver in a mobile phone, a professional geodetic GPS device or a total station or a geodetic one-frequency L1 GPS.

In another advantageous performance, a differential model between DTM of the existing surface of the measured object, e.g. roads, and a digital model of the project is used for objective inspection of quality of the measured object geometric parameters, e.g. roads, or for navigation for the geometric parameter inspection.

In another advantageous performance, geometric statistics of the measured objects of the individual structures are used for objective evaluation and comparison of the structures and reconstructions of the measured objects and their contractors.

The second part of the presented invention concerns the measuring device for the measurement method performance and following determination of spatial coordinates of the object surface for performance of the measurement method, processing and use of data, which is based on a set of three road vehicles. This set comprises a middle vehicle determined for the detailed point collection and comprising a device for the detailed point collection, which is e.g. at least one laser scanner, a device for position measurement of the device for detailed point collection, which is especially a GNSS device, a device for elevation measurement on target devices, which is e.g. a levelling device, a total station, or a levelling rotational laser and a device for the collection and storage of measured data from the device for detailed point collection.

The end vehicle for backsight comprises target devices for the measurement of identical point elevations, e.g. a levelling rod; the front vehicle for foresight comprises target devices for the measurement of identical point elevations, e.g. a levelling rod, and a device for the measurement of the target device position, e.g. a GNSS device.

Road vehicles are cars, especially passenger cars, trucks, a caterpillar vehicle, remote-control models, trailers, semi-trailers, other pulling and towing platforms, etc., moving as a whole behind each other during the measurement stage.

The use of the invention results is in the following main areas. The first use of the invention result is for the evaluation of quality of structures and their contractors. Nowadays, specific geometric parameters specified in the project documentation and by contractual conditions are most frequently evaluated by the state-of-the-art technology. For example, these are most frequently evaluated on the roads in cuts in 5 m to 20 m on the edges and in the middle. These evaluations are burdened with a subjective effect of the measurement operator (measurement operator selects the detailed measured points) on the results and they do not assure that the quality specified in the project documentation and by the contractual conditions is followed. Therefore, they have not been used so far for the evaluation scale of structures and their contractors. Unlike state-of-the-art technology, the invention results enable accurate, objective, mathematically reverse-verifiable evaluation of reconstruction performance quality, and thus eliminate any disputes. It is possible to determine the amount and size of spatial changes of the surface depending on the time by means of repeated inspections with the determined time interval, and thus obtain accurately defined and objectively measurable characteristics of the hidden quality or the amount of the performed work.

Another use of the invention result is as a milling machine navigation during road repairs. Nowadays, a customer has a rough idea about repairs and the length of the road he wants to have repaired. Simplified data are most often used in the form of layer thickness determination for milling off and the following new layer laying, which usually corresponds with the method of designing and performance. The milling machine operator most often performs the milling by means of a manual process for depth adjustment and milling inclination in relation to the existing road surface. This can lead to uneven milling of elevation depending on the unevenness of the road surface, and it can lead to errors during milling of incorrect thicknesses. This results in contractor's higher costs or reducing the lifetime of repairs for the customer due to insufficient thicknesses of the structural layers.

BRIEF DESCRIPTION OF DRAWINGS

Now the presented invention will be explained in details and described with regard to the enclosed figures, in which.

DETAILED DESCRIPTION OF THE INVENTION

Figure 1:
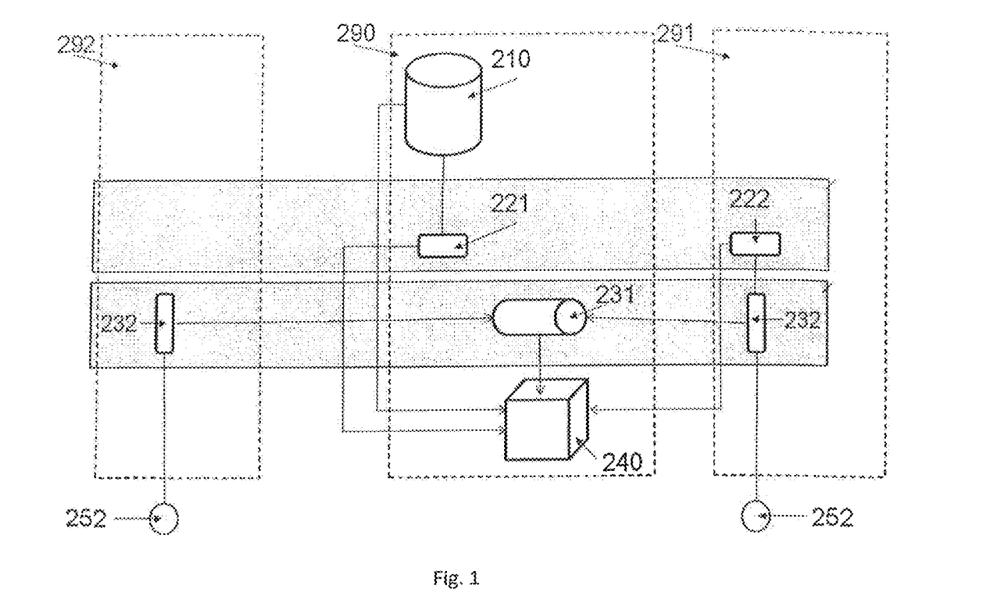
FIG. 1 shows the schematic representation of the measuring device comprising measuring instruments and their compact connections according to the presented invention.
Figure 2:
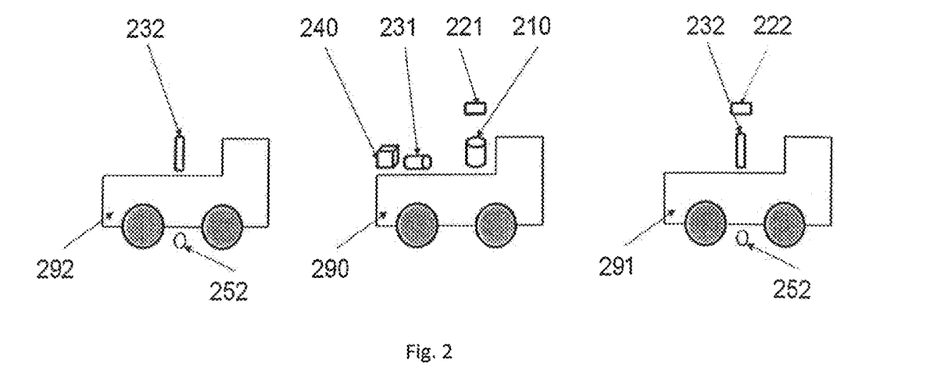
FIG. 2 shows the schematic representation of the layout of measuring instruments on road vehicles according to the presented invention.

Now, the measuring device, which consists of three parts, will be described (FIG. 1 and FIG. 2):

The first part of the measuring device consists of a middle vehicle 290, where there is a laser scanner 210 for detailed surface measurement, an aerial and a GNNS geodetic receiver 221 for the determination of the laser scanner 210 position, a device 231 for the elevation determination and a computer 240 for data collection (and basic data processing). Alternatively, individual parts of the measuring device can already be combined in a single device from the manufacturer (e.g. a laser scanner with a GNSS aerial). The instruments of the first measuring device part are placed and mutually connected on the platform. When the vehicle stops, this platform is stabilised firmly with the terrain and individual devices can measure without surrounding effects (e.g. vehicle vibrations due to the surrounding traffic) of inclinations of the middle vehicle 290. The levelling device will be suitably used as a device 231 for elevation determination.

The second and the third parts of the measuring device consist of two additional vehicles 291 and 292, where on the front vehicle 291 there is an aerial of the GNSS geodetic receiver 222 for determination of identical point positions 252; on both additional vehicles 291 and 292 there are target devices 232, e.g. levelling rods for elevation measurement with the levelling device 231 and the determination of identical point elevations 252. Levelling rods of the levelling device are attached with a variable positioning mechanical clamp which enables placing the levelling rod on the stabilised identical point 252.

It is possible to operatively combine and change the measuring device to achieve a higher measurement speed, higher data accuracy or work safety using the following alternatives:

The levelling device 231 can be alternatively replaced by a total station and the levelling rods 232 can be replaced by reflective prisms or alternatively by a levelling rotational laser and laser receivers. The measurement of position and elevation of identical points 252, and/or also the positions and elevations of the laser scanner 210 is performed trigonometrically by means of the classic geodetic method.

Alternatively, surveying of the position and elevation of identical points 252 can be performed time independently on surveying of the detailed points on the surface with the laser scanner 210. Detailed points on the surface are independently measured with the laser scanner 210 with the determination of the scanner position with the GNSS receiver 221 by the first part of the measuring device only, and the position and elevation of the identical points 252 is measured independently by means of levelling or trigonometric method (tachymetric measurement with the total station).

The data are saved in the computer 240 for data collection (and basic processing) directly in the terrain during measurement, or subsequently during administrative processing. The computer 240 ensures communication with the laser scanner 210 for the determination of detailed surface points, it ensures communication with the GNSS receiver 221 for the determination of the laser scanner position 210, it ensures communication with the GNSS receiver 222 for the determination of identical point positions 252 and it ensures communication with the levelling device 231 for the determination of identical point elevations 252.

The method of measurement performance, data collection and processing will be described hereunder. The method comprises steps for instrument assembly in one measuring device, compact use of the measuring device (use of ail parts as a whole) in the same time period, accuracy improvement of determination of the laser scanner 210 position, orientation and inclinations, elevation and position accuracy improvement of data registration from identical point measurement 252.

The measuring device is suitable for finding of absolute (non-selective) geometric parameters (flatness, inclinations, thicknesses, volumes, etc.) for planning, implementation and inspection of road construction and repairs.

Measurement is performed at standstill, when individual instruments of the measuring device placed on the vehicles or independently create one unit during measurement and moving. During one cycle of the measuring device, the determination of GNSS 221 receiver position is performed, and thus the determination of laser scanner 210 position. The determination of the position of two and more stabilised or non-stabilised identical points 252 is further performed, on which the levelling rod 232 is placed (placed on the end and front vehicles 291). The determination of the elevation of two and more stabilised or non-stabilised identical points 252 is further performed with the levelling device 231 by means of the levelling rods 232. Stabilised identical points 252 are the points of the altimetric traverse and at the same time they serve, together with the non-stabilised identical points 252, for the elevation accuracy improvement of detailed data from laser scanning.

Figure 9:
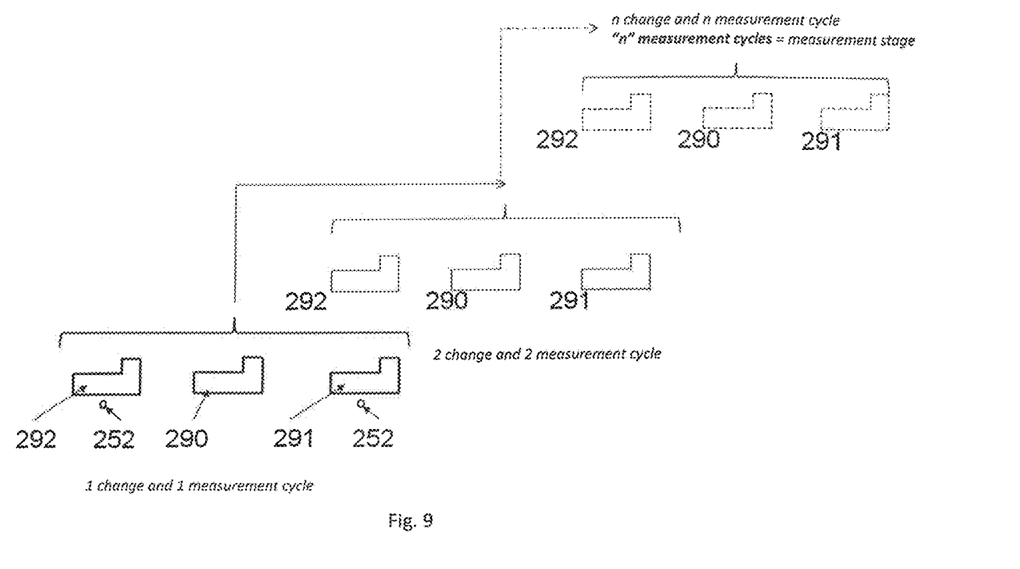
FIG. 9 is a schematic example of one stage measurement of an object, e.g. a road, which consists of the connecting measurement and measurement cycles of individual changes of the measuring device.

The measurement itself starts in the initial elevation geodetic point, which is the point of the construction site, the setting-out network or the state network with the known and stable elevation above sea level, from which the altimetric traverse with the change points identical with identical points comes from. The calibrated levelling rod is placed in the initial elevation geodetic point and the classic connection altimetric traverse is measured up to the place of the measurement interest, e.g. a road. The connection to more elevation geodetic points is advantageous in case that any elevation point is damaged in time. At the moment when the change point is on the measured object, e.g. a road, the measuring device according to the invention is used. The backsight is performed to the first calibrated levelling rod 232, the foresight is performed to the second calibrated levelling rod 232, which are placed on vehicles 291 and 292 (that represents the measurement cycle in one change of the measuring device according to the invention). By means of comparison of both the levelling rods 232 based on the knowledge of the rod meter length values, it is possible to eliminate a possible error by implementing the correction of the incorrect length of the rod meter, which has only effect in a highly broken terrain and it is ignored during a more common use of levelling. For this reason, it is not necessary to change the rods 232 back and forth. This enables the measuring device, or its three vehicles 290, 291 and 292 can move compactly without the necessity to adjustments, and thus overtake other road vehicles. Next measurement cycles follow with other changes of the measuring device according to the invention. It is necessary to stabilise the identical points 252, e.g. by means of the gun nails into the road surface. This is performed by the operator of the front vehicle 291. The operator of the end vehicle 292 ensures safety with a warning sign at the back part of the vehicle in case that the measurement is performed on the road with traffic and the operator watches the traffic. The operator of the middle vehicle 290 operates the instruments of the measuring device using a computer for the data collection and performs basic data processing. The measuring device as a whole enables determination of the laser scanner 210 position, the determination of the levelling rod 232 position placed in the identical points 252 with the GNSS receivers 221 and 222 and with the levelling device 231. In the same time period during one stop, i.e. in one adjustment of the measuring device, the detailed terrain measurement is performed with the laser scanner 210 and so-called point cloud is obtained. The measurement is finished in the elevation geodetic point with the known and stable elevation above sea level. Thus, one stage of the road object measurement is completed, which consists of the connecting measurement and n cycles of measurement of individual measuring device changes, FIG. 9.

The measuring stages can be repeated in the determined time intervals in individual layers of road construction due to changes caused by the progress of construction or road repairs or due to vertical shifts of the object. The project documentation, customer needs or found vertical shifts or changes of the object determine the number of measurement stages and the interval between them.

During the next measurement stage, it is necessary to connect the elevation geodetic points to the identical points from the first stage.

The method according to the invention is also characterised in that that before starting the measurement itself the levelling rods 232 for the determination of rod meter length are properly compared. To ensure safety on the road with traffic, it is not then necessary to change the rods 232 back and forth and the measuring device is moved compactly as a whole. The stabilisation of the identical points 252, e.g. by means of gun nails put into the road surface, is performed for accuracy improvement of the identical point positions 252.

In one cycle the detailed surface measurement is performed with the laser scanner 210 which creates so-called point cloud with the minimum density of 500 points per m$^2$. The measured data are saved in the data collection computer 240 or alternatively in the memory units of the measuring instruments, an external memory or a central storage to the network, etc. The levelling device 231 can be alternatively replaced by the total station and the levelling rods by the reflective prisms or the levelling rotational laser and the laser receivers. The vehicles 290, 291 and 292 can be alternatively replaced by other carriers if the safety requirements allow so, and the measurement in the same time period is kept. The measuring set can be advantageously extended by a INS/IMU device for on-line registration of the elements of the external orientation (orientation, and transversal and longitudinal inclination) of the laser scanner. This device is placed on the carrier together with the laser scanner 210. Such measuring set can perform scanning and measuring at the same time with the vehicle movement between the scan-positions. In this way, it is possible to increase the density and uniformity of measuring points and at the same time improve accuracy of the direct determination of the elements of the external orientation of the laser scanner 210 in the scan-position during the measurement in the standstill (not moving) position.

The method according to the invention is characterised in that that the position and the approximate elevation of the laser scanner 210 is directly determined with the GNSS receiver 221. The approximate levelling of the laser scanner 210 is then directly determined with an electronic bubble. The last step is the direct determination of approximate orientation with the device for the determination of the laser scanner 210 orientation.

Figure 3:
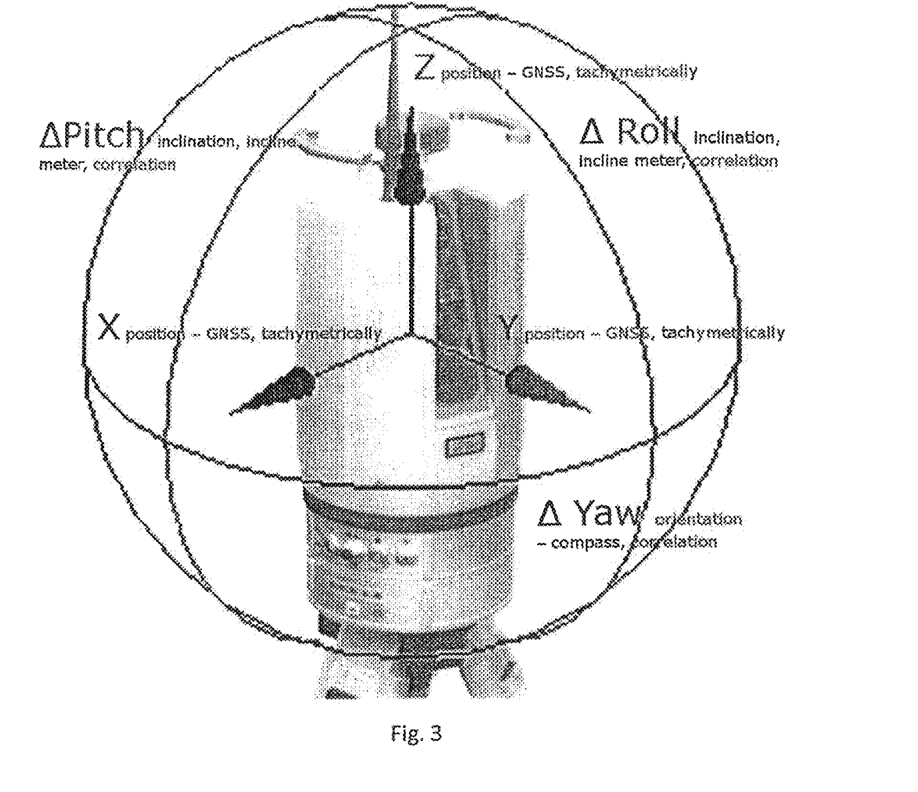
FIG. 3 shows the determination of the final position and orientation and approximate elevation and inclinations of the individual scan-position.

The coordinate evaluation runs in the following steps:

The determination of the position and data orientation of individual scan-positions (FIG. 3). The point clouds of the road surface are measured in the coordinate system of the laser scanner 210; the beginning is in the centre 310 of the laser scanner 210. The data are transformed by means of the position measurement of the laser scanner 210 (GNSS 221 or tachymetrically with the total station), cloud correlation (algorithm of the repeated transformation for minimising the difference between the point clouds), and the data from the device for orientation determination into the global coordinate system. We obtain a final position and orientation and an approximate elevation and inclination of the point cloud of the individual scan-position using this direct process.

Figure 4:
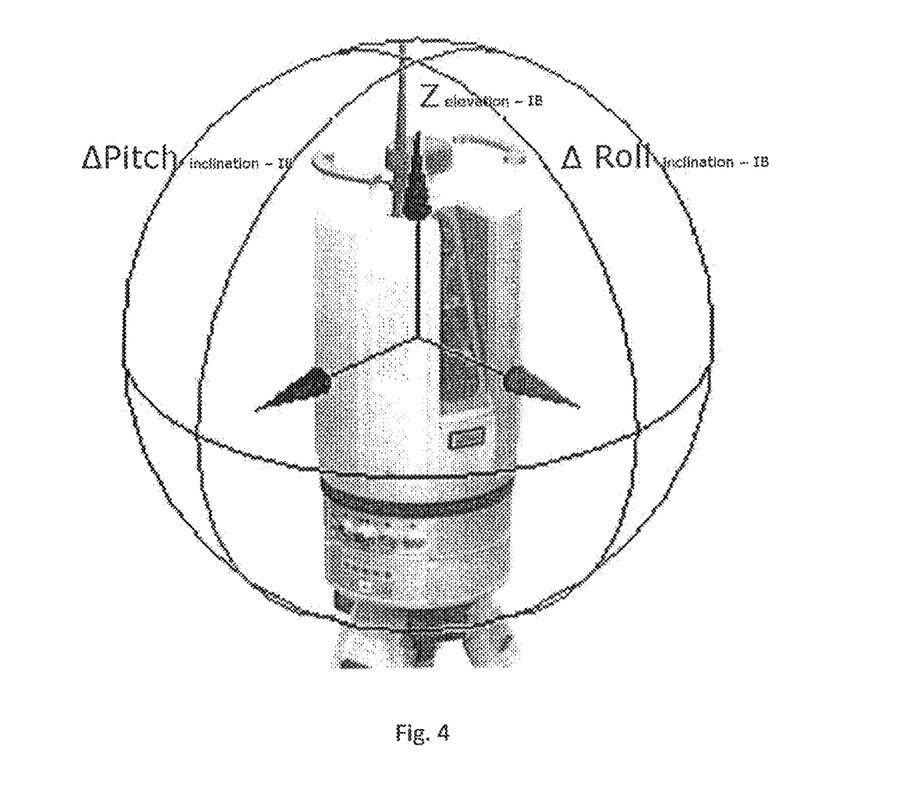
FIG. 4 shows the accuracy improvement and determination of the final elevation and inclinations of the individual scan-position.
Figure 5:
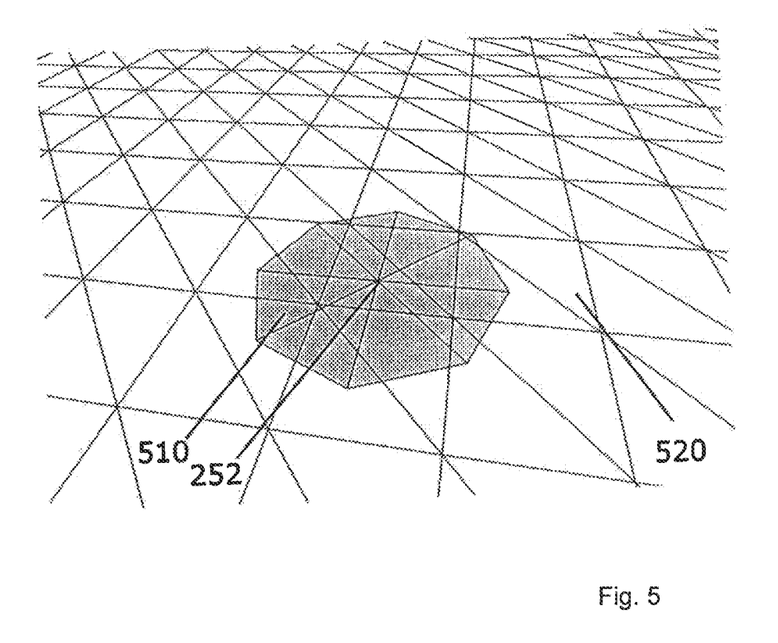
FIG. 5 shows the geometric transformation (digital terrain model and identical point represented with octagon).

The elevation position of the laser scanner 210 and the inclination of individual scan-position data are then made more accurate (FIG. 4). To achieve a higher elevation accuracy of output data, the data are transformed in terms of elevation and inclination by means of the measured stabilised and non-stabilised identical points 252. The calculation is based on the geometric transformation (optimised adjusting calculation)—when the position of the scan-position changes based on the similarity of the inclination and position of the triangles. The triangulated network (TIN—triangulated irregular network) is created from the measured point clouds, thus, the first model 520 for transformation (FIG. 5). The regular octagons 510 (eight triangles) are created from the measured identical points 252, thus, the second model for transformation; all points have the same measured elevation. Each scan position is made more accurate based on at least three identical points 252 (it is better to use 8-12 identical points). It is also possible to use geometric transformation based on other geometric shapes than triangles—e.g. squares, rectangles, polygons, spheres, blocks, cubes and other 3D shapes.

Figure 6:
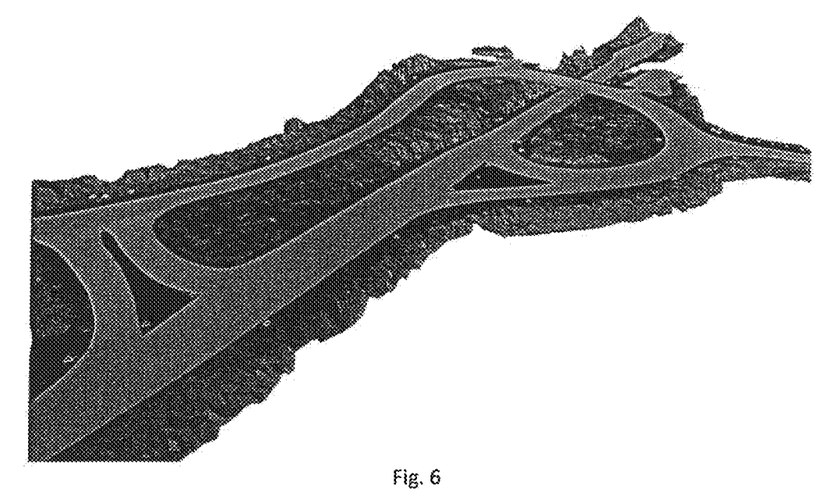
FIG. 6 shows a digital terrain model.

The point clouds determined in terms of position and elevation are then classified into individual groups so that point clouds of the measured object surface are only the result. The classified surface data are then filtered for the required density. The filtration removes the data noise from laser scanning, the absolute accuracy of the points representing the surface is increased and the data are decreased in terms of volume for the standard calculation, graphic and design software. Vectorization of the edges, i.e. compulsory lines for the resulting digital terrain model, is performed by manual selection or automated process based on the change of the terrain model direction or coloured boundary (data reflection intensity) of the measured data. DTM can be created from the obtained and processed detailed points and compulsory lines on the terrain surface according to invention (FIG. 6).

The result of the measurement and the processing is a DTM, which represents a digital representation of the real topographic surface of the object based on the measured data with the guaranteed elevation surface accuracy characterised by the elevation standard deviation from 2 mm to 5 mm with regard to the vertical coordinate system at any place of the measured object. The elevation standard deviation from 2 mm to 5 mm is achieved by using either the levelling identical points 252, or trigonometrically surveyed identical points 252. In case of further development of the laser scanner accuracy and creation of better quality modelling of atmospheric physical functions, it is possible to achieve a higher accuracy than 2 mm. The position standard deviation of measurement is defined by the surveying accuracy of the scanner position by means of the GNSS method or trigonometric method.

The method according to the invention is also characterised by possible repeatability of measurement as one of the necessary conditions for the objectiveness of results. The objectiveness of results is ensured by connecting to the identical elevation geodetic points in all measurement stages, by the measuring device according to the invention and the following process of the point clouds registration according to the invention. A basic precondition for using this method is a suitable selection of the measuring instruments. The second basic precondition is the adherence to the generally known principles for accurate geodetic measurements.

In this way, it is possible to achieve a result of a wide network of roads and other surfaces with high accuracy of elevation determination characterised by the elevation standard deviation towards the geodetic point field from 2 mm to 5 mm, with the minimum effect of temperature, pressure, the subjective measurement operator activity, safety hazards on the result. The advantage of the solution is repeated DTM creation according to the invention.

Figure 7:
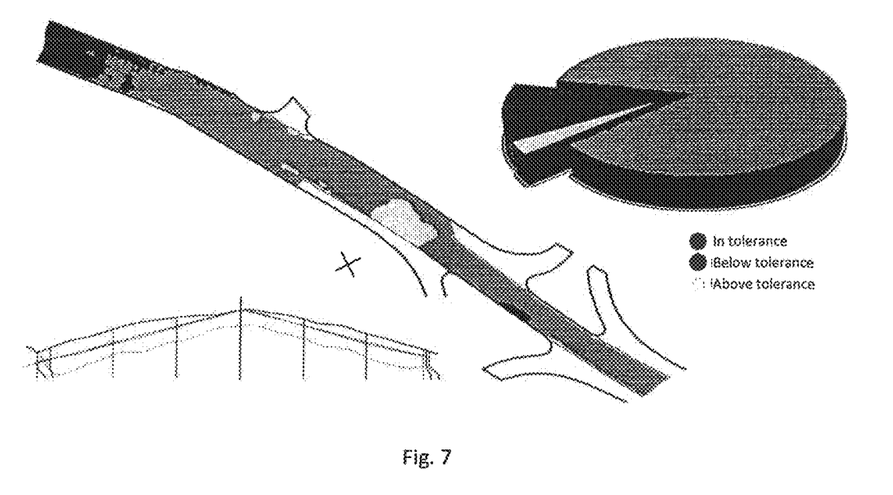
FIG. 7 shows quality inspection of performed work on the road—coloured differential terrain model, road cross-section and individual layers, a chart of geometric work performance quality.

The third part of the presented invention concerns usability of the measurement result and data processing. The basic precondition is using the data processing steps. The result usability comprises the objective evaluation and comparison of measured objects, i.e. constructions and surface reconstructions and their contractors, navigation for milling during the road repairs or navigation for the geometric parameter inspection. One of the basic outputs is mutual DTM comparison according to the invention or with a digital project model. The comparison outputs can be visualised by means of a differential terrain model, a chart or a cross-section (FIG. 7).

Usability of the Digital Terrain Model According to the Invention

Project Documents—

DTM usability according to the invention for the creation of a digital model of a project for repairs, reconstructions, renovations or constructions of new roads, runways, hall floors and other paved surfaces (FIG. 6) and then for the objective determination of material volume (work amount) of selected items, e.g. a bill of quantities.

Quality Inspection—

DTM usability according to the invention for the inspection of geometric parameters and thicknesses of road structure layers and of other surfaces. The information about the adherence to the flatness, shape, inclination and volume of the used material can be obtained by comparing the surveyed surface with the digital project model or with the previous stage. The surface unevenness can also be inspected based on analyses of flatness, such as the simulation of the levelling rod laying, the comparison with the reference plane, etc. The result according to the invention can be used for objective calculations of geometric statistics of the structure section on-line or for whole structures in computer programmes of companies available in the industry, for the objective inspection of the measured object, the objective evaluation and comparison of road constructions and reconstructions and their contractors (FIG. 7). Repeated inspections with the determined time interval can further determine the amount and size of spatial changes of the surface depending on time, and thus it is possible to obtain accurately definable and objectively measurable characteristics of the hidden quality of the performed work.

Volume Determination—

DTM usability according to the invention for the objective volume determination (the performed work amount which is defined by the project documentation, e.g. a bill of quantities) of individual layers of road structures (from cement-concrete stabilisation up to top wearing surface layer) or other layers of surveyed surfaces.

Navigation of Milling Machines and Navigation of Geometric Parameter Inspection—

Figure 8:
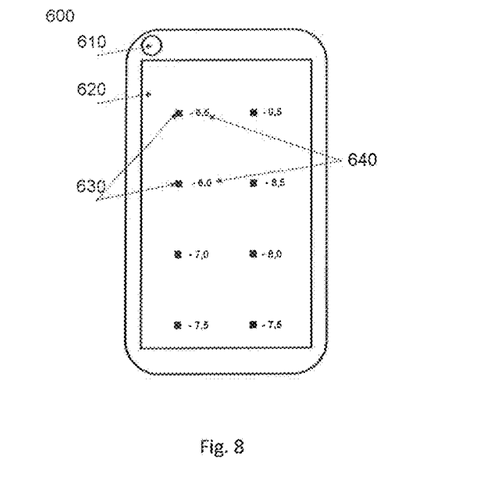
FIG. 8 is an exemplary performance of the accurate navigation for milling during road repairs using a mobile phone or other device.

DTM usability according to the invention for navigation of a milling machine during road repairs; the aim is to replace the manual milling process or add and/or replace a complicated and demanding system of automatic control of elevation and cross-wise inclination of the milling drum by a simple method without the time consuming preparation, while using available technologies (e.g. a mobile phone or other device with a display for displaying graphic outputs of the milling map and with a GNSS receiver) and available applications for navigation. The milling machine operator uses this navigation for setting the milling depth and inclination in the given place. The milling depth and inclination in the device are continuously changed in relation to the changing position of the milling machine determined by the GNSS device in navigation. This will enable the milling machine operator to obtain accurate/real information about the milling depth from the digital project model created based on DTM according to the invention, or in other use, it will enable the operator to check the quality by displaying the real geometric parameters of the road object (thicknesses, inclinations and other dimensions of road objects). A programme application of the navigation 620 is installed into the device 600, such as a mobile phone or other device with a display for displaying graphic outputs of the milling map and with a GNSS receiver (FIG. 8), where it is possible to record and display the DTM transferred into a map, in which the values in the given place are displayed (e.g. the milling depth for the given place calculated from the digital model of the milling project). The uniqueness of this combination lies in the fact that it is a combination of the position determination by the GNSS receiver with the receiver 610 with a lower accuracy in the navigation or other device 600 and in assigning the elevation (possibly the elevation difference) 640 from the DTM difference according to the invention to the digital model of the milling project (so-called milling map is created). By this unique combination, the navigation with the GNSS receiver with a lower accuracy can be used as the accurate navigation using the DTM with the guaranteed elevation accuracy of the surface characterised by the elevation standard deviation from 2 mm to 5 mm in relation to the vertical coordinate system at any place of the measured object (DTM according to the invention).

Web Applications—

DTM usability according to the invention for transformation into the raster format for web map applications, map servers and mobile applications with the possibility of visualisation. In these applications, data are divided to layers which can be compared with the digital project model, or with data from the previous measurement stage and it is possible to use functions of on-line calculations of geometric statistics of the structure section for the inspection of compliance of actual geometric parameters with the digital project model in a tabular summary or a graphic illustration, and it is possible to use the volume determination of actually performed work or the difference to the designed volumes (hereafter referred to as "3D information").

Comparison of Quality of Structures—

DTM usability according to the invention for finding the objective 3D information can be used for the system of evaluation and comparison of road constructions and other paved surfaces with regard to various parameters (contractor, structure type, project, range, location etc.). Parameter evaluation of geometric quality of contractors for the quality scale of contractor works is the most frequently used one. Based on the contractor evaluation and the quality scale of contractor works, contractors for new jobs of road constructions and reconstructions can be selected more objectively, not only based on the price of work and the guarantee period, but also according to the criterion of geometric quality as one of the accompanying and in this case objective features of quality evaluation.

The invention method has already been verified in several constructions in the Czech Republic, Sweden, Norway, and the examples are stated below:

Example 1

The surveying of the road using the Stop&go laser scanning method at the road construction of the Jinočanská connecting road, Prague 5. The capital city of Prague—the City Investor Department was the construction investor. The measurement was performed on 24 Sep. 2013 and it was connected to the setting-out network supplied by the investor. The detailed measurement was performed with the Riegl VZ-400 laser scanner, the scanner position was determined by the GNSS Trimble R5800, 4700 (Base-Rover). The approximate scanner levelling was performed with the internal sensor of the Riegl VZ-400 scanner. The approximate orientation was performed with an external compass. The data accuracy improvement was performed based on identical points which were surveyed from the polygonal traverse performed with the Leica TRC 1103 total station, connected to the geodetic point field. The detailed point measurement was performed with the laser scanner placed on the personal vehicle, the point cloud was surveyed with the minimum density of 2000 points/m² or higher. The identical point surveying was performed independently on the detailed measurement on the same day with the Leica TRC 1103 total station. The result of the measurement is the DTM which was consequently used for the geometric parameter inspection, drainage condition finding, as-built documentation for asserting claims and the data were also made accessible to the investor on the web interface. The resulting DTM elevation standard deviation in relation to the vertical coordinate system of the setting-out network is 4 mm; 199 inspection points were used for the calculation. This resulting deviation was verified and confirmed by independent specialists from the Department of Special Geodesy K154 from ČVUT (Czech Technical University) in Prague.

Example 2

The surveying of the road using the Stop&go laser scanning method on the D47 motorway (353,185-359,639 km of the D1 motorway). The Road and Motorway Directorate of the Czech Republic was the construction investor. The measurement was performed on 30 Oct. 2013, 2 Nov. 2013 and it was connected to the setting-out network supplied by the investor. The detailed measurement was performed with the Riegl VZ-400 laser scanner, the scanner position was determined with the GNSS Trimble R8 (Base-CZPOST Ostrava). The approximate scanner levelling was performed with the internal sensor of the Riegl VZ-400 scanner, the approximate orientation was performed by means of the cloud correlation to the data from the surrounding scan-positions. The data accuracy improvement was performed based on the identical points, which were surveyed by the GNSS method in terms of position and by the accurate levelling connected to the setting-out network in terms of elevation. The detailed point measurement was performed with the laser scanner placed on the personal vehicle; the point clouds were surveyed with minimum density of 2000 points/m² or higher. The identical point surveying was performed independently of the detailed measurement. The result of the measurement is the DTM which was consequently used for the geometric parameter inspection, comparison with the previous measurement stage and the project digital model, as-built documentation for asserting claims. The resulting DTM elevation standard deviation in relation to the vertical coordinate system of the setting-out network is 2 mm; 658 inspection points were used for the calculation. This resulting deviation was verified and confirmed by an investor's independent coordinator.

Example 3

The surveying of the hall in a warehouse in Sweden—Schenker, ARLANDA STAD, Stockholm by means of the static laser scanning method. The Arlanda Hall was the construction investor. The measurement was performed on 14 Nov. 2010 and it was connected to the local geodetic point field. The detailed measurement was performed with the Leica HDS 6100 laser scanner, the scanner position was determined with the Leica TCR 1203+ total station. The approximate laser scanner levelling and orientation was performed by means of the cloud correlation to the data from the surrounding scan-positions. The data accuracy improvement was performed based on the identical points, which were surveyed in terms of position by the trigonometric method with the Leica TCR 1203+ total station and in terms of elevation by the accurate levelling connected to the geodetic point field with the NA3003 device. The detailed point measurement was performed with the laser scanner placed on the tripod; the point cloud was surveyed with the minimum density of 5000 points/m². The identical point surveying was performed independently on the detailed measurement. The result of the measurement is the DIM with density of 400 points/m², which was consequently used for the geometric parameter inspection, as-built documentation for asserting claims. The resulting DTM elevation standard deviation in relation to the vertical coordinate system of the geodetic point field is below 2 mm.

The above stated examples document the usability of the presented solution in 3D practice during the real job orders verified according to ISO 4463 and Directive no. August 2011 of the General Manager of ŘSD ČR (Road Administration of the Czech Republic). The other parts of the solutions, which are not verified in the examples, have been verified by means of individual test measurements, scientific surveys and calculations. All individual measuring parts of the device are instruments of companies available in the industry.

INDUSTRIAL APPLICABILITY

The geometric quality (compliance of the result within the permissible deviations determined by the project documentation) is one of the parameters significantly contributing to the resulting quality of the work. An indisputable advantage is that the geometric quality is exactly defined by the project documentation, and therefore unambiguously provable and verifiable. Moreover, the inspection can be performed absolutely/in detail (not only selectively as with other qualitative parameters) and therefore, it can be legitimately considered as one of the accompanying features of quality evaluation.

The DTM usability according to the invention for the creation of a digital project model and the new method of objective determination of material volume (the amount of work) of the selected items, e.g. a bill of quantities, makes the documents for awarding contracts and quotation calculations significantly more accurate, and thus minimises error rate and risks of additional work.

The new method of objective evaluation of contractor's quality and contractor's ranking can be implemented as one parameter of the "quality" evaluating criterion within the selection process of the contractor by the customer.

The new navigation method of the geometric parameter inspection radically makes more accurate and simplifies customers' work during the process of acceptance of roads or the whole new construction or reconstruction.

The new method of the milling machine navigation during road repairs significantly makes more accurate and simplifies the work during road repairs in comparison with the traditional method or the modern method, which is not usable or is complicated in many situations. The method of the milling machine navigation during road repairs we propose uses a simpler and cheaper technology, while achieving the same or better results. At the same time, this technology does not have to be installed on the construction machines during all the period of reconstruction and it can be used for other projects. Thus, the costs are significantly reduced.

The invention claimed is:

1. A method of measurement, processing and use of a digital terrain model ("DTM") for objective evaluation of geometric parameters of surfaces of a measured object, including roads and other surfaces, by which the DTM is obtained with a same elevation accuracy in relation to a vertical coordinate system at any place of the measured object, wherein measurements are performed by a measuring device comprising a set of three vehicles (290, 291, 292) arranged in a row, said set of three vehicles comprising an end vehicle (292), a middle vehicle (290) and a front vehicle (291), said measuring device further comprising instruments including—
- a laser scanner (210), a first Global Navigation Satellite System (GNSS) receiver (221) and a levelling device for elevation determination (231), all arranged on the middle vehicle (290);
- a target device (232) arranged on each of the end vehicle (292) and the front vehicle (291), and configured to be used in combination with the levelling device (231) for elevation determination;
- a second GNSS receiver (222) arranged on the front vehicle (291);
wherein the measurements are performed in n successive measurement cycles by the instruments of the measuring device, which are at standstill during each measurement, and which are moved as a whole between individual measurement cycles; where n measurement cycles create one measurement stage; wherein n is a number of measurement cycles;
wherein the method comprises the following steps:
during each measurement cycle:
performing a position measurement of the laser scanner (210) using the first GNSS receiver (221);
performing a surface measurement of the measured object with the laser scanner (210) at a scan-position so as to obtain a point cloud in a coordinate system of the laser scanner;
performing a stabilization of a front point located at the front vehicle (291) on the surface of the measured object;
surveying a position of the front point at least by the second GNSS (222) receiver; and
performing at least one backsight elevation measurement of the target device (232) on the end vehicle (292), which is located at an end point, and at least one foresight elevation measurement of the target device (232) on the front vehicle (291), which is located at the front point, using the levelling device for elevation sighting (231) on the middle vehicle (290), so as to measure elevations of the front and end points;
after measurements of a measurement cycle are completed, or during such measurements, saving data about the position, of the laser scanner (210), point cloud data, and data about the elevations of the front and end points in a computer (240);
after each measurement cycle, moving the measuring device as a whole, so that,
the middle vehicle (290) is moved to a new scan-position for another surface measurement of the measured object using the laser scanner (210);
the end vehicle (292) is moved to a new backsight position, which is the front point (252), which was occupied by the front vehicle (291) in the previous measurement cycle; and
the front vehicle (291) is moved to a new foresight position where, during a next measurement cycle, stabilisation and measurements of a new front point will be performed using the levelling device (231) on the middle vehicle, and the target device (232) and second GNSS receiver (222) on the front vehicle;
wherein when one measurement stage is completed, the method includes the following additional steps:
transforming the spatial coordinates of points of the point clouds obtained via the laser scanner (210) into a global coordinate system using the measured position of the laser scanner (210) at each individual scan-position of the laser scanner (210) and a point cloud correlation algorithm between individual point clouds of the measurement stage, by which a final position, a final orientation, and an approximate inclination of the point cloud of each individual scan-position of the laser scanner (210) is obtained,
making the point clouds more accurate by performing a transformation of the data about the front and end points in terms of elevation and inclination;
further processing the obtained and more accurate data into a digital model of a real topographic surface of the measured object, wherein the digital model represents surface points on the measured object with the elevation accuracy of the surface in a given time of the measurement of one stage.

2. The method according to claim 1, wherein during the measurements, front and end points are connected to a set of elevation geodetic points in case that one of the geodetic elevation points is damaged in time.

3. The method according to claim 1, wherein each measurement stage starts and ends with measurement cycles in identical elevation geodetic points with known and stable elevations above sea level.

4. The method according to claim 1, wherein the front point is marked with a reflexive colour to be found during the next cycle with the backsight.

5. The method according to claim 1, wherein before starting a measurement stage, both the target devices (232) comprising levelling rods are aligned based on a knowledge of rod meter length values, by which a possible error is eliminated by implementing a correction of an incorrect length of the rod meter, which enables transferring the instruments of the measuring device.

6. The method according to claim 1, wherein the measurement of the position of the laser scanner (210) and the positions and elevations of the front and end points are performed with GNSS receivers (221, 222) and by the levelling device (231) in a same time period of each cycle.

7. The method according to claim 1, wherein individual measurement stages are repeated in determined time intervals and for individual layers of the measured object structure by which precisely defined, objectively determined and mathematically reverse-verifiable data about a shape, inclination, volume, spatial change in the given time interval of one or two stages of the measured object or its parts are obtained.

8. The method according to claim 7, wherein the transformation of the front and end points includes a geometric transformation which is based on geometric shapes, including triangles, squares, rectangles, polygons, spheres, blocks, cubes and other 2D and 3D shapes.

9. The method of measurement according to claim 8, wherein a DTM is created from each individual measurement stage, wherein such DTMs represent the points of the measured object surface with the same elevation surface accuracy wherein an elevation standard deviation ranges from 2 mm to 5 mm in relation to the vertical coordinate system at any place of the measured object, wherein the DTMs from individual measurement stages are used for comparing with project digital models or with DTMs from other measurements stages.

10. The method according to claim 9, wherein a differential model between the DTM of the surface of the measured object and digital models of a project of individual structural parts is used for objective determination of a volume of selected item material, including a bill of quantities.

11. The method according to claim 9, wherein a differential model between the DTM and a digital project model is used for navigation of milling during road repairs.

12. The method according to claim 11, wherein during repairs of the measured object including road repairs, information from a differential digital terrain model about a milling depth is transferred to a place of a project implementation by navigation in a telephone or geodetic device, when information about the DTM elevation in a certain place of the measured object is obtained by assigning of the elevation from the DTM and by a position determination with a lower accurate device, including a GNSS receiver in a mobile phone, professional geodetic GPS device or total station or geodetic one-frequency L1 Global Positioning System (GPS).

13. The method according to claim 12, wherein a differential model between the DTM of the measured object, and digital models of the measured object is used for an objective quality inspection or for navigation of the geometric parameters of the measured object.

14. The method according to claim 9, wherein geometric statistics of the measured objects are used for objective evaluation and comparison of constructions and reconstructions of the measured objects.

* * * * *